(12) United States Patent
Hashiguchi

(10) Patent No.: US 8,888,381 B2
(45) Date of Patent: Nov. 18, 2014

(54) OPTICAL MODULE BASE AND OPTICAL MODULE

(71) Applicant: Japan Aviation Electronics Industry, Limited, Tokyo (JP)

(72) Inventor: Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/857,996

(22) Filed: Apr. 6, 2013

(65) Prior Publication Data
US 2013/0279861 A1  Oct. 24, 2013

(30) Foreign Application Priority Data
Apr. 20, 2012  (JP) .................................. 2012-096751

(51) Int. Cl.
G02B 6/38 (2006.01)
G02B 6/42 (2006.01)
(52) U.S. Cl.
CPC .................................. *G02B 6/4274* (2013.01)
USPC ..................................... 385/89; 257/E33.066
(58) Field of Classification Search
CPC .................................................. G02B 6/4274
USPC ............................... 385/88, 89; 257/E33.066
See application file for complete search history.

(56) References Cited

U.S. PATENT DOCUMENTS

| | | | | |
|---|---|---|---|---|
| 5,416,872 A * | 5/1995 | Sizer et al. | ...................... | 385/92 |
| 5,436,997 A * | 7/1995 | Makiuchi et al. | ............... | 385/92 |
| 5,510,758 A * | 4/1996 | Fujita et al. | .................... | 333/247 |
| 5,675,684 A * | 10/1997 | Hirataka et al. | ................. | 385/88 |
| 5,719,979 A * | 2/1998 | Furuyama | ........................ | 385/89 |
| 6,222,967 B1* | 4/2001 | Amano et al. | ................... | 385/49 |
| 6,352,442 B1* | 3/2002 | Kudo | ............................. | 439/260 |
| 6,491,447 B2* | 12/2002 | Aihara | ............................ | 385/92 |
| 6,576,888 B2* | 6/2003 | Fujimura et al. | .......... | 250/227.11 |
| 6,599,032 B1* | 7/2003 | Kurashima et al. | .............. | 385/89 |
| 6,625,369 B1* | 9/2003 | Frojdh | .......................... | 385/132 |
| 6,754,407 B2* | 6/2004 | Chakravorty et al. | ........... | 385/14 |
| 7,050,678 B1* | 5/2006 | Isono et al. | ...................... | 385/39 |
| 7,441,964 B2* | 10/2008 | Hamasaki et al. | ............... | 385/89 |
| 2003/0002770 A1* | 1/2003 | Chakravorty et al. | ........... | 385/14 |
| 2003/0053767 A1* | 3/2003 | Cheng et al. | ..................... | 385/89 |
| 2003/0232536 A1* | 12/2003 | Saito et al. | ..................... | 439/495 |
| 2004/0017977 A1* | 1/2004 | Lam et al. | ........................ | 385/49 |
| 2008/0298745 A1* | 12/2008 | Hamasaki et al. | ............... | 385/39 |
| 2010/0061683 A1* | 3/2010 | Sasaki | ............................. | 385/88 |
| 2012/0292660 A1* | 11/2012 | Kanno | ............................. | 257/99 |
| 2014/0050490 A1* | 2/2014 | Giziewicz | ...................... | 398/139 |

FOREIGN PATENT DOCUMENTS

JP  2005-165125  6/2005

* cited by examiner

*Primary Examiner* — Peter Radkowski
(74) *Attorney, Agent, or Firm* — Greenblum & Bernstein, P.L.C.

(57) ABSTRACT

An optical module base is made up of a plurality of lead frames and a resin structure integrally molded with the lead frames and has an optical device mounting part and an optical waveguide mounting part which are formed in the resin structure. Each of the lead frames includes a connection part to which an optical device is to be mounted and electrically connected and a lead part which is continuous with the connection part. A portion of the thickness of the connection part is embedded in the resin structure and is positioned at the optical device mounting part. A sufficient strength of fixing a lead frame on a resin structure integrally molded with the lead frame can be ensured even if the sizes of the lead frames are miniaturized according to the sizes of electrodes of an optical device to be flip-chip bonded.

21 Claims, 8 Drawing Sheets

OPTICAL MODULE BASE AND OPTICAL MODULE

TECHNICAL FIELD

The present invention relates to an optical module and, in particular, to a structure of an optical module base used for constructing an optical module.

BACKGROUND ART

FIGS. 1A and 1B illustrate a configuration of an optical module described in Japanese Patent Application Laid Open No. 2005-165125 (published on Jun. 23, 2005), which is an example of conventional optical modules. The optical module in the example includes a lead frame 11, a light-receiving device 12, a sealing structure 13, a ferrule 14, a preamplifier 15 and a capacitor 16.

The lead frame 11 includes a plurality of terminals 11a to 11e. The terminal 11a is a terminal for supplying power to the light-receiving device 12 and includes a light-receiving device mounting area 11f. Electrodes are formed on two opposed surfaces of the light-receiving device 12. Mounting the light-receiving device 12 on the light-receiving device mounting area 11f electrically connects one of the two electrodes of the light-receiving device 12 to the terminal 11a.

An opening 11g is formed in the light-receiving device mounting area 11f. Light from an optical fiber 17 held by the ferrule 14 is guided to the light receiving surface 12a of the light-receiving device 12 through the opening 11g.

The terminal 11b is a GND terminal and includes a preamplifier mounting area 11h. The preamplifier 15 and the capacitor 16 are mounted in the preamplifier mounting area 11h. The preamplifier 15 is electrically connected to the other electrode of the light-receiving device 12 through a bonding wire. The capacitor 16 is a parallel plate capacitor. The preamplifier 15 is connected to the terminal 11c, which is a power supply terminal, through the capacitor 16.

The terminals 11d and 11e are terminals for outputting signals from the preamplifier 15 and are electrically connected to the preamplifier 15 through bonding wires.

The lead frame 11 is covered with the sealing structure 13 in such a way that one end of each of the terminals 11a to 11e is exposed. The sealing structure 13 is molded of a resin that is transparent to light from the optical fiber 17 and includes a positioning part 13a, a light path conversion part 13b and a device placement part 13c.

The positioning part 13a includes a ferrule enclosing part 13d and an optical fiber enclosing part 13e. The ferrule enclosing part 13d defines the position of the ferrule 14 and the optical fiber enclosing part 13e defines the position of the optical fiber 17.

The light path conversion part 13b includes an incidence surface 13f and reflective surface 13g. The reflective surface 13g reflects light exiting the optical fiber 17 and transmitted through the incidence surface 13f to allow the light to be incident on a light receiving surface 12a.

The device placement part 13c is a part for exposing the light-receiving device mounting area 11f and the preamplifier mounting area 11h of the lead frame 11 and is recessed. The device placement part 13c is ultimately covered with a potting resin, which protects the light-receiving device 12, the preamplifier 15, the capacitor 16 and the bonding wires.

In the optical module described above, the light-receiving device has a configuration in which electrodes are provided on two opposed surfaces, one of the electrodes is mounted on and connected to a lead frame and the other electrode is connected by wire bonding. However, light-receiving devices and light emitting devices are not limited to ones that have this electrode arrangement. For example, some types of light-receiving devices and light emitting devices are flip-chip bonded. In a flip-chip bonded surface emitting device or surface light-receiving device, multiple electrodes are disposed on the surface where light emitting surface or light receiving surface are located.

The electrodes arranged in this way are tiny and the lead frames to which they are flip-chip bonded also need to be miniaturized accordingly.

A flip-chip bonding method that applies ultrasonic vibration to a chip (device) for bonding is also used. In this method, lead frames need to be firmly fixed to ensure that ultrasonic vibration is precisely applied to a portion to be bonded.

However, as seen in the fixing structure of the light-receiving device mounting area 11f of the lead frame 11 of the optical module illustrated in FIGS. 1A and 1B, the light-receiving device mounting area 11f is merely placed on the sealing structure 13 and only the bottom surface is in contact with the sealing structure 13. Therefore, the lead frame 11 is not firmly fixed on the sealing structure 13 and it is highly possible that ultrasonic vibration applied will vibrate the lead frame itself. If the lead frame is miniaturized according to the sizes of the electrodes of the surface emitting device or the surface light-receiving device to be flip-chip bonded, the possibility of lead frame vibrating may so increase that enough bonding strength cannot be achieved and problems such as bounding failures may result.

SUMMARY TO THE INVENTION

An object of the present invention is to provide an optical module base that ensures a sufficient strength of fixing a lead frame on a resin structure integrally molded with the lead frame even if the lead frame is miniaturized according to the sizes of electrodes of an optical device to be flip-chip bonded and to provide an optical module constructed with the optical module base.

The present invention provides an optical module base including a plurality of lead frames and a resin structure which is integrally molded with the lead frames and having an optical device mounting part and an optical waveguide mounting part formed in the resin structure, wherein each of the lead frames includes a connection part to which an optical device is mounted and electrically connected and a lead part which is continuous with the connection part. A portion of the thickness of the connection part is embedded in the resin structure and is positioned at the optical device mounting part.

An optical module according to the present invention includes the optical module base described above, an optical device mounted to the optical device mounting part, an optical waveguide mounted to the optical waveguide mounting part, and a substrate on which an IC to be connected to the lead parts by wire bonding is mounted. The optical device mounting part is a recess formed at an edge of one surface of the resin structure. The recess is opened at a side surface of the resin structure that is continuous with that surface. The resin structure includes a substrate mounting part protruding and extending from the side surface. The substrate is mounted on the substrate mounting part and a wire bonding surface of the IC is flush with wire bonding surfaces of the lead parts.

An optical module base according to the present invention can improve the strength of fixing of the connection part of lead frames to which an optical device is to be mounted and electrically connected.

In an optical module according to the present invention, a connection part of each lead frame is firmly fixed to the resin structure. Therefore, a sufficient bonding strength can be ensured even if ultrasonic flip-chip bonding is used for bonding an optical device.

DETAILED DESCRIPTION OF THE EMBODIMENTS

Exemplary embodiments of the present invention will be described below.

Figure 1A:
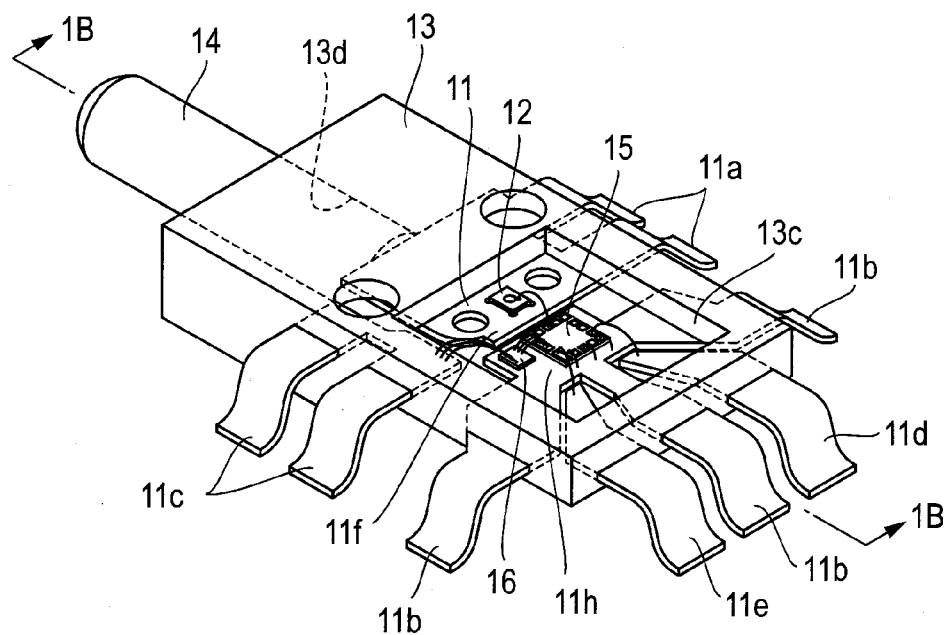
FIG. 1A is a perspective view of an example of a conventional optical module.
Figure 1B:
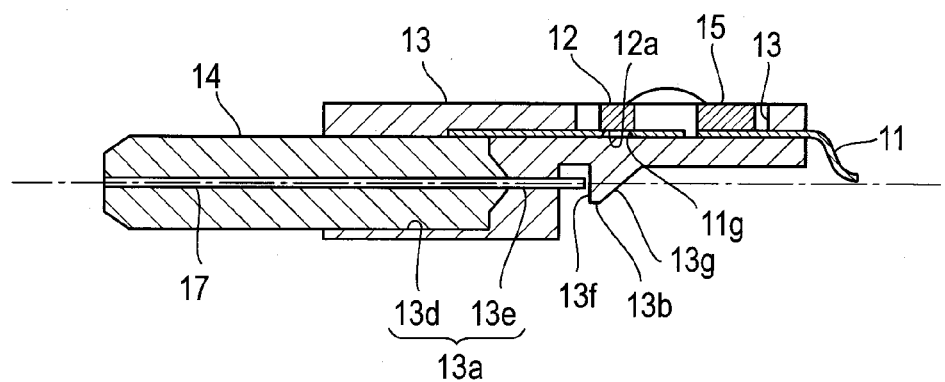
FIG. 1B is a cross-sectional view taken along line 1B-1B in FIG. 1A.
Figure 2A:
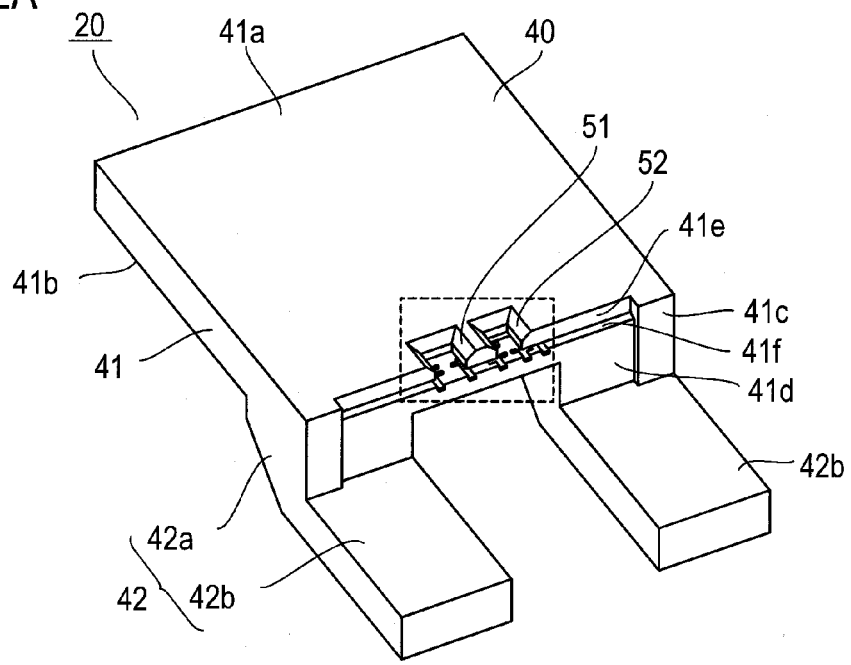
FIG. 2A is a perspective view illustrating one exemplary embodiment of an optical module base according to the present invention.
Figure 2B:
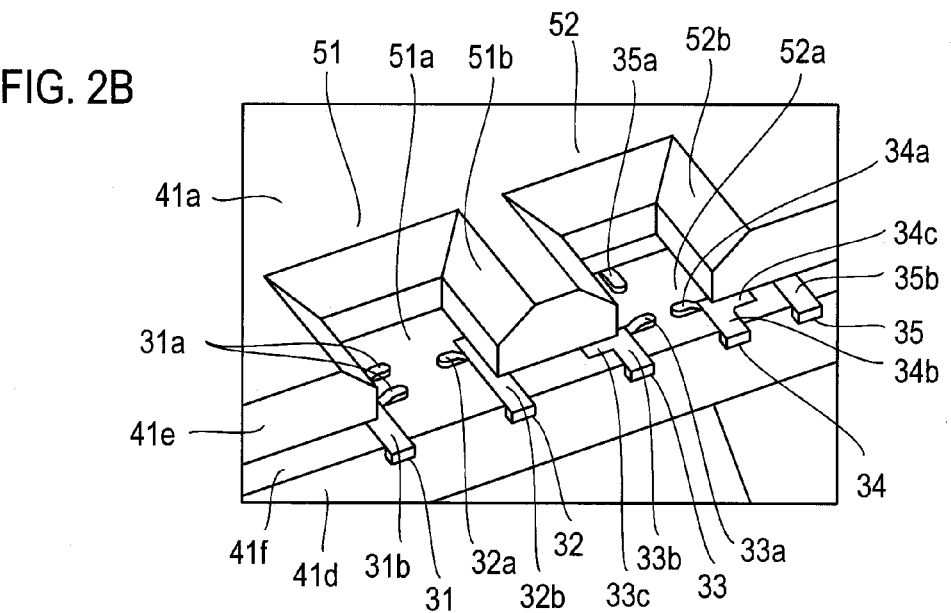
FIG. 2B is an enlarged view of a portion enclosed in a dashed box in FIG. 2A.
Figure 2C:
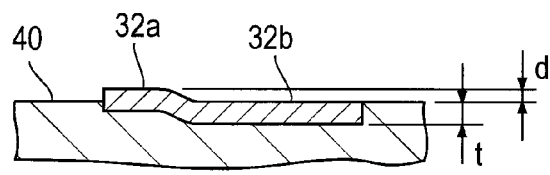
FIG. 2C is a diagram illustrating a bend of a lead frame connection part.

FIGS. 2A to 2C illustrate a configuration of one exemplary embodiment of an optical module base according to the present invention. The optical module base 20 includes lead frames 31 to 35 and a resin structure 40. The resin structure 40 is integrally molded with the lead frames 31 to 35 inserted in it.

Figure 3A:
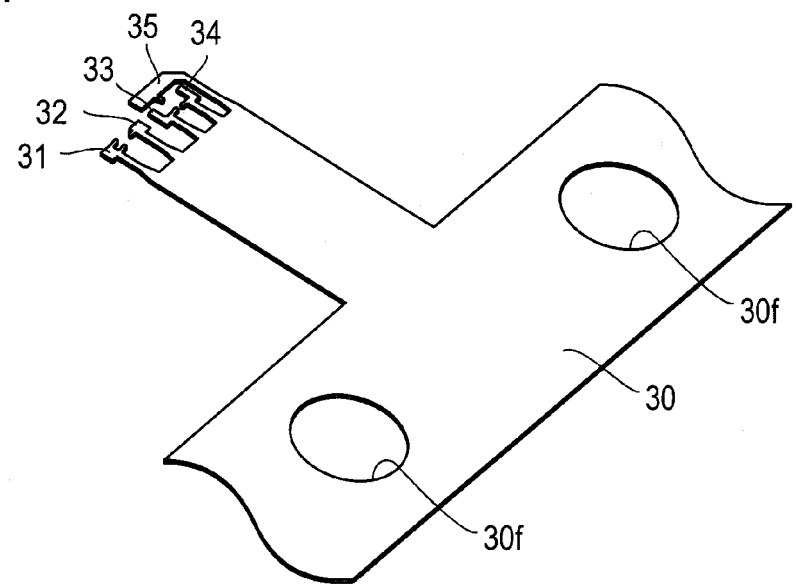
FIG. 3A is a perspective view of lead frames with a carrier.
Figure 3B:
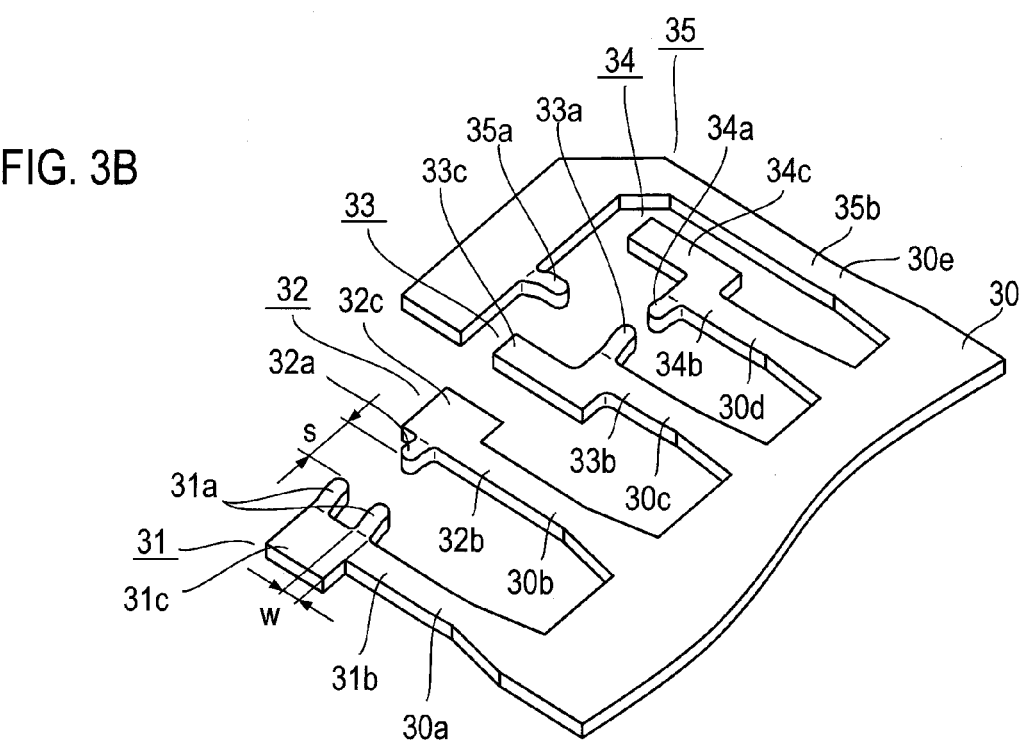
FIG. 3B is an enlarged view of a portion of FIG. 3A.

FIGS. 3A and 3B illustrate in detail the lead frames 31 to 35 with a carrier before insert molding. The carrier 30, bridges 30a to 30e and a pilot hole 30f are depicted in FIGS. 3A and 3B.

The lead frame 31 includes a connection part 31a to which an optical device is to be mounted and to be electrically connected to electrodes of the optical device and a lead part 31b which is continuous with the connection part 31a. Similarly, the other lead frames 32 to 35 include connection parts 32a to 35a and lead parts 32b to 35b. The lead parts 31b to 35b extend to the bridges 30a to 30e.

The connection parts 31a, 32a of the lead frames 31, 32 protrude inward from inner sides of the lead parts 31b, 32b, respectively. In this example, the lead frame 31 includes two connection parts 31a.

Extensions 31c, 32c protruding and extending outward from outer sides of lead parts 31b, 32b are provided at tips of the lead parts 31b, 32b.

Connection parts 33a, 34a of the lead frames 33, 34 protrude inward from inner sides of the lead parts 33b, 34b, respectively. Extensions 33c, 34c extending from outer sides of the lead parts 33b, 34b in the direction in which the lead parts 33b, 34b extend are formed at tips of the lead parts 33b, 34b.

On the other hand, the lead part 35b of the lead frame 35 extends in the shape of the letter L and a connection part 35a is protruded from the inner side of one side of at the tip of the L-shape. The connection part 35a protrudes toward the connection parts 33a, 34a in the direction orthogonal to the direction in which the connection parts 33a, 34a protrude. One side of the L-shaped lead part 35b at which the connection part 35a is formed is wider than the other sides as illustrated in FIG. 3B.

The base end of each of the connection parts 31a to 35a that is connected to the lead part 31b to 35b is bent and the connection parts 31a to 35a are positioned higher than the lead part 31b to 35b as illustrated in FIG. 3B.

The lead frames 31 to 35 configured as described above and supported by the carrier 30 are made from a metal plate by punching and bending in a press. The metal plate may be a copper plate. After the press, the plate is plated with gold. The connection parts 31a to 35a are tiny. The width w and the distance s illustrated in FIG. 3B are for example w=50 μm and s=75 μm.

Figure 4:
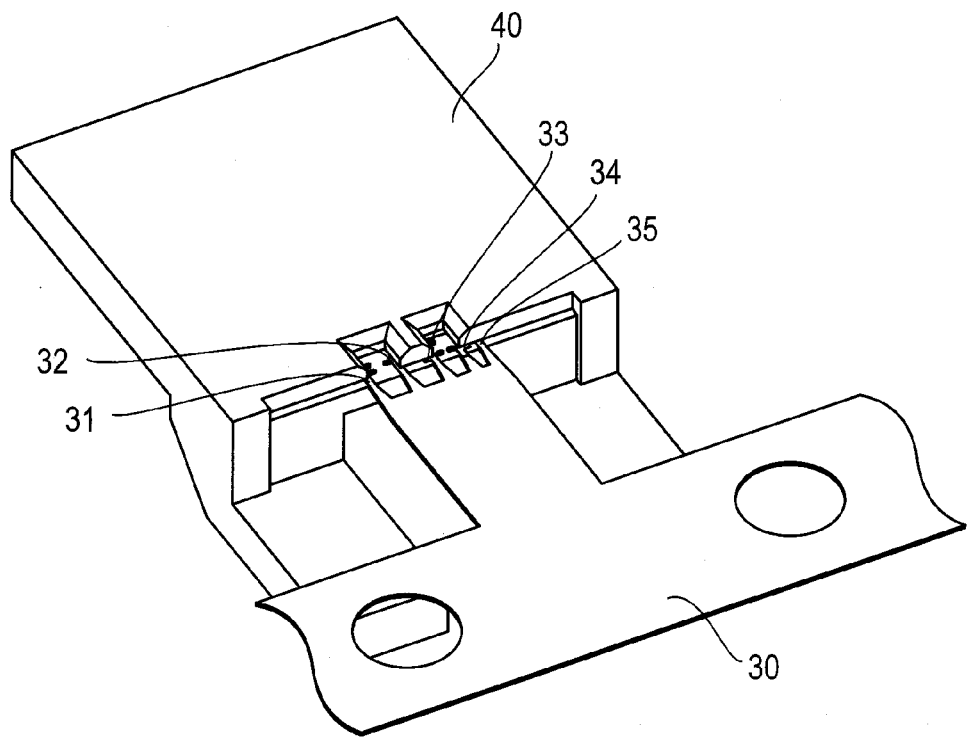
FIG. 4 is a perspective view illustrating the optical module base illustrated in FIG. 2A before the carrier is cut away.

FIG. 4 illustrates the lead frames 31 to 35 supported by the carrier 30 as illustrated in FIG. 3A which are integrally molded with a resin structure 40. The optical module base 20 illustrated in FIG. 2A can be made by cutting the bridges 30a to 30e to remove the carrier 30.

The optical module base 20 in this example is structured to accommodate a surface emitting device and a surface light-receiving device and two optical device mounting parts 51, 52 are provided in the resin structure 40.

The resin structure 40 includes a square main part 41 and a pair of arms 42 protruding and extending from the main part 41. Each of the pair of arms 42 includes a base part 42a protruding from the lower surface 41b of the main part 41 and a substrate mounting part 42b extended from the base part 42a in parallel with the lower surface 41b. As illustrated in FIG. 2A, the pair of substrate mounting parts 42b are positioned at both ends of one side of the square main part 41 and protrude from a side surface 41c of that one side of the main part 41 in parallel with each other.

A recess 41d lower than both ends is formed in the side surface 41c of the main part 41 except in the both ends. The recess 41d is extended to the base parts 42a of the pair of arms 42. A step part 41e lower than the recess 41d is formed at the upper end of the recess 41d (at the upper surface 41a side of the main part 41).

The optical device mounting parts 51, 52 are recesses which are formed at the edge of the upper surface (one surface) 41a of the main part 41 where the step part 41e is formed and communicate with the step part 41e. The optical device mounting parts 51, 52 formed as the recesses are opened at the side surface 41c of the main part 41. The inner bottom surfaces 51a, 52a of the optical device mounting parts 51, 52 are flush with a step surface 41f which is formed by the step part 41e and lower than the upper surface 41a of the main part 41.

The connection parts 31a, 32a of the insert-molded lead frames 31, 32 are positioned at the inner bottom surface 51a of one optical device mounting part 51; the connection parts 33a to 35a of the lead frames 33 to 35 are positioned at the inner bottom surface 52a of the other optical device mounting part 52. The lead parts 31b to 35b of the lead frames 31 to 35 are run to the side surface 41c side of the main part 41 and slightly protrude from the recess 41d formed in the side surface 41c. The tips of the protruding parts are cut surfaces of the bridges.

A portion of each of the lead parts 31b to 35b of the lead frames 31 to 35 and a portion of each of the extensions 31c, 32c and the extensions 33c, 34c are covered with resin of the resin structure 40. All of the thickness of exposed portions of the lead parts 31b to 35b and the extensions 33c, 34c, except the portions protruding from the recess 41d, are embedded in the resin structure 40 so that the exposed surfaces of the exposed portions are flush with the inner bottom surfaces 51a, 52a of the optical device mounting parts 51, 52 and the step surface 41f.

On the other hand, the connection parts 31a to 35a of the lead frames 31 to 35 are bent to a position higher than the lead parts 31b to 35b as described earlier and a portion of the thickness of each connection part 31a to 35a is embedded in the resin structure 40. FIG. 2C illustrates this embedment by taking the connection part 32a as an example. The difference d in height between the connection part 32a and the lead part 32b produced by the bending is smaller than the thickness t of the lead frame 32 so that a portion of the thickness of the connection part 32a is embedded in the resin structure 40. Since a portion of the thickness of each of the connection parts 31a to 35a of the lead frames 31 to 35 is embedded in the resin structure 40 in this way, the connection parts 31a to 35a slightly protrude from the inner bottom surfaces 51a, 52a of the optical device mounting parts 51, 52.

Figure 5A:
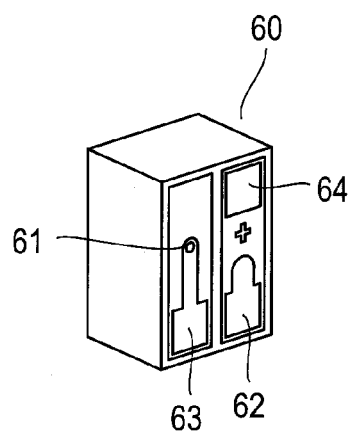
FIG. 5A is a perspective view of a surface emitting device.
Figure 5B:
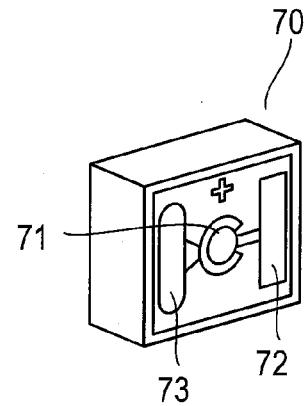
FIG. 5B is a perspective view of a surface light-receiving device.

FIGS. 5A and 5B illustrate optical devices mounted to the optical device mounting part 51, 52. FIG. 5A illustrates a surface emitting device and FIG. 5B illustrates a surface light-receiving device. The surface emitting device 60 may be a VCSEL (Vertical Cavity Surface Emitting Laser), for example, and the surface light-receiving device 70 may be a PD (photodiode), for example. A light emitting surface 61 and electrodes 62 to 64 are depicted in FIG. 5A. A light receiving surface 71 and electrodes 72, 73 are depicted in FIG. 5B. The electrode 64 of the surface emitting device 60 is a dummy electrode for mechanically fixing the surface emitting device 60.

A configuration of the optical device mounting parts 51, 52 and the substrate mounting part 42b of the optical module base 20 and a configuration of the surface emitting device 60 and the surface light-receiving device 70 mounted to the optical device mounting parts 51, 52 have been described. The optical module base 20 further includes optical waveguide mounting parts to which optical waveguides to be optically connected to the surface emitting device 60 and the surface light-receiving device 70 are mounted. The optical waveguide mounting parts are formed in the lower surface 41b of the main part 41 of the resin structure 40 that is opposite from the upper surface 41a in which the optical device mounting parts 51, 52 are formed. A configuration of the optical waveguide mounting parts will be described later.

FIGS. 6A, 6B, 7 and 8A to 8C illustrate a configuration of an optical module 100 constructed with the optical module base 20 described above. The optical module 100 includes the optical module base 20, the surface emitting device 60, the surface light-receiving device 70, optical fibers 81, 82 which are optical waveguides, and a substrate 90 in which a required wiring pattern is formed and required devices (ICs) are mounted. The wiring pattern formed in the substrate 90 is omitted from the figures.

The surface light-receiving device 70 and the surface emitting device 60 are mounted to the optical device mounting parts 51, 52, respectively, of the optical module base 20 by flip-chip bonding. The flip-chip bonding in this example is performed by applying ultrasonic vibration. Specifically, ultrasonic vibration is applying to each of the surface light-receiving device 70 and the surface emitting device 60 to vibrate them, thereby bonding electrodes 72, 73 of the surface light-receiving device 70 to the connection parts 31a, 32a of the corresponding lead frames 31, 32 and bonding electrodes 62 to 64 of the surface emitting device 60 to the connection parts 33a to 35a of the corresponding lead frames 33 to 35. Tapered surfaces 51b and 52b are provided at the opening end provided in the upper surface 41a of the main part 41 to make it easier for surface light-receiving device 70 and surface emitting device 60 to be placed in the optical device mounting parts 51, 52, respectively.

The optical fibers 81, 82 are mounted in optical waveguide mounting parts 53 formed in the lower surface 41b of the main part 41 of the resin structure 40. The optical waveguide mounting parts 53 are V-shaped grooves in this example. Two V-shaped grooves are formed for mounting two optical fibers 81, 82. The optical waveguide mounting parts 53, which are V-shaped grooves, are formed in the bottom surface of a trench 41g formed in the lower surface 41b of the main part 41.

The fiber core 81a, 82a of the optical fibers 81, 82 are placed, positioned and fixed in the optical waveguide mounting parts 53 which are V-shaped grooves. The fixation is accomplished by adhesion.

A step part 41h deeper than the trench 41g and continuous with the trench 41g is formed at an end in the direction in which the trench 41g extends. The step part 41h is extended to a side surface 41i of the main part 41. On the other hand, a recess 41j which is deeper than the trench 41g and continuous with the trench 41g is formed at the other end in the direction in which the trench 41g extends. Ends of each of the fiber cores 81a, 82a is positioned in the recess 41j.

The end of the lower surface 41b of the main part 41 next to the recess 41j where the ends of the fiber cores 81a, 82a are positioned is cut away to form an inclined surface 41k. A convex reflective surface 41m is formed in a region of the inclined surface 41k that is located on a phantom line extended from each of the fiber cores 81a, 82a as illustrated in FIG. 8C.

The pair of reflective surfaces 41m convert the light path between the optical fibers 81, 82 and the surface light-receiving device 70 and surface emitting device 60 to align optical axes. As illustrated in FIG. 8C, light exiting the optical fiber core 81a is reflected and condensed by the reflective surface 41m and is incident on the surface light-receiving device 70. On the other hand, light emitted from the surface emitting device 60 is reflected and condensed by the reflective surface 41m and enters the optical fiber core 82a. In this way, light travels through the resin structure 40 to optically connect the optical fibers 81, 82 to the surface light-receiving device 70 and the surface emitting device 60 in this example. The resin structure 40 is made of an insulating resin that is transparent to the transmitted light.

How a substrate 90 is mounted and connected to the optical module base 20 will be described next.

Figure 6A:
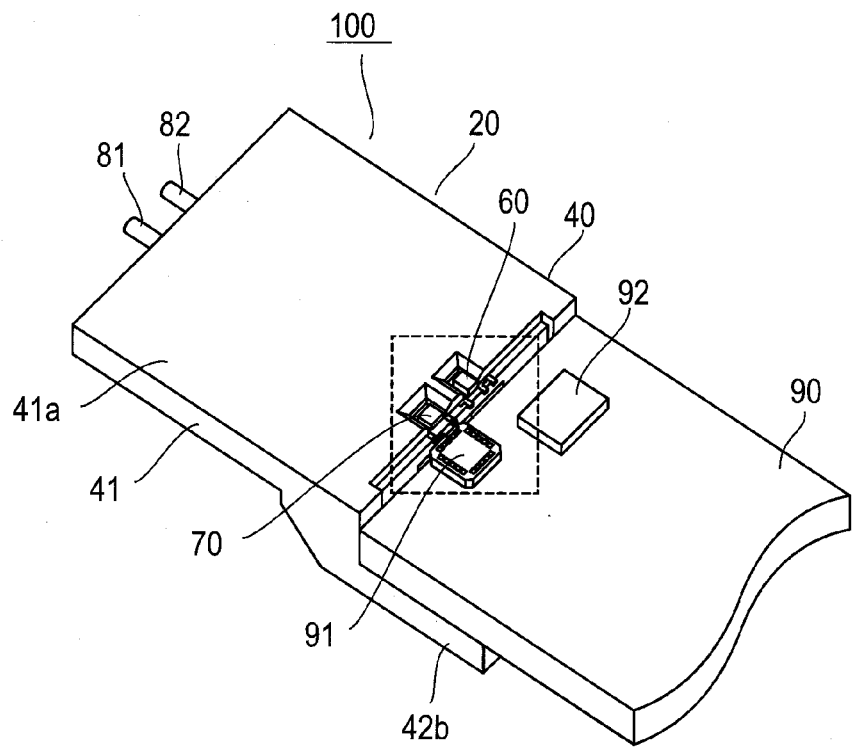
FIG. 6A is a perspective view of an optical module constructed with the optical module base illustrated in FIG. 2A.
Figure 6B:
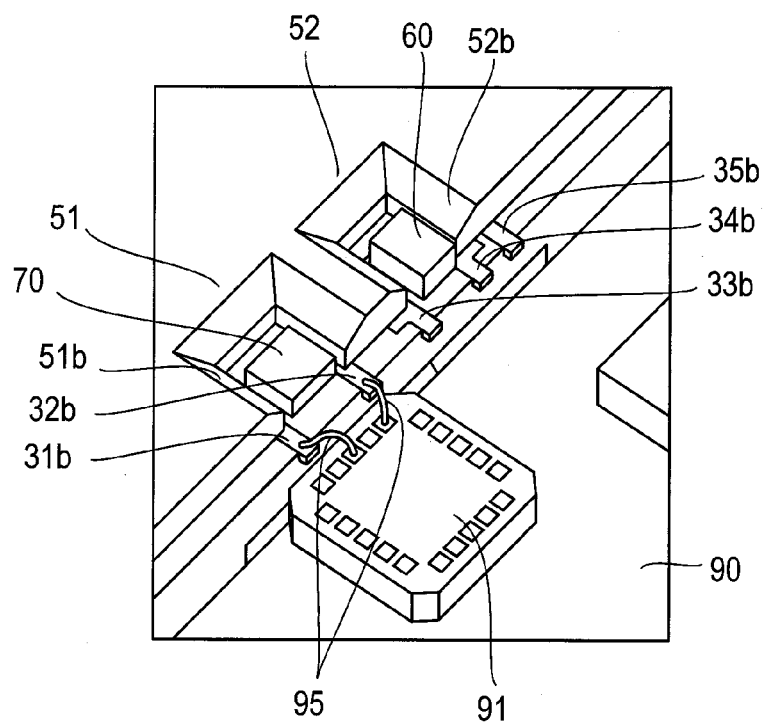
FIG. 6B is an enlarged view of a portion enclosed in a dashed box in FIG. 6A.
Figure 7:
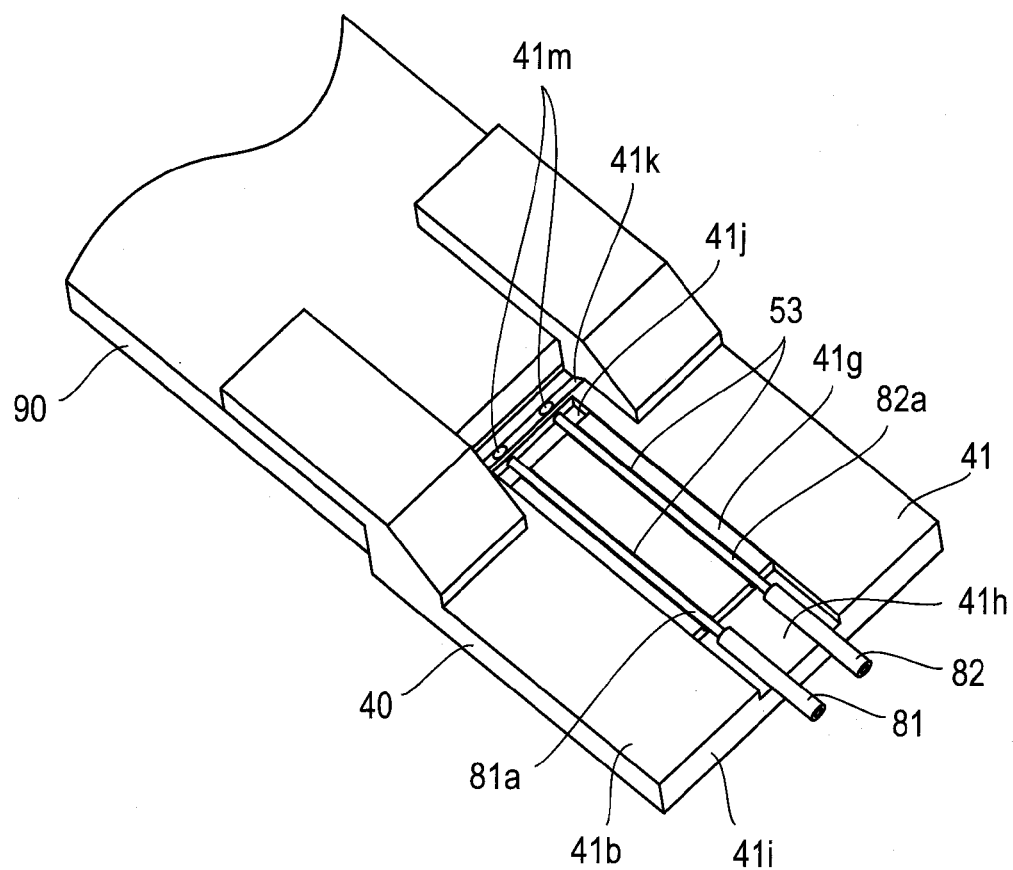
FIG. 7 is a perspective view of the optical module illustrated in FIG. 6A viewed from the bottom.

The substrate 90 is mounted and fixed to the substrate mounting part 42b formed in the resin structure 40. Among the lead frames 31 to 35, the lead parts 31b to 34b of the lead frames 31 to 34 that provide electrical connections are electrically connected to ICs on the substrate 90 by wire bonding. FIG. 6A illustrates two ICs 91, 92. The IC 91 may be a trans impedance amplifier (TIA), for example. In this example, the IC 91 is fixed to the substrate 90 with an adhesive with the electrodes up (with the electrodes being on the upper surface). The IC 91 is connected by wire bonding to the lead parts 31*b*, 32*b* of the lead frames 31, 32 to which the surface light-receiving device 70 is mounted. Bonding wires 95 are depicted in FIG. 6B. Bonding wires between the lead parts 33*b*, 34*b* of the lead frames 33, 34 and IC 92 are omitted from FIGS. 6A and 6B.

Figure 8A:
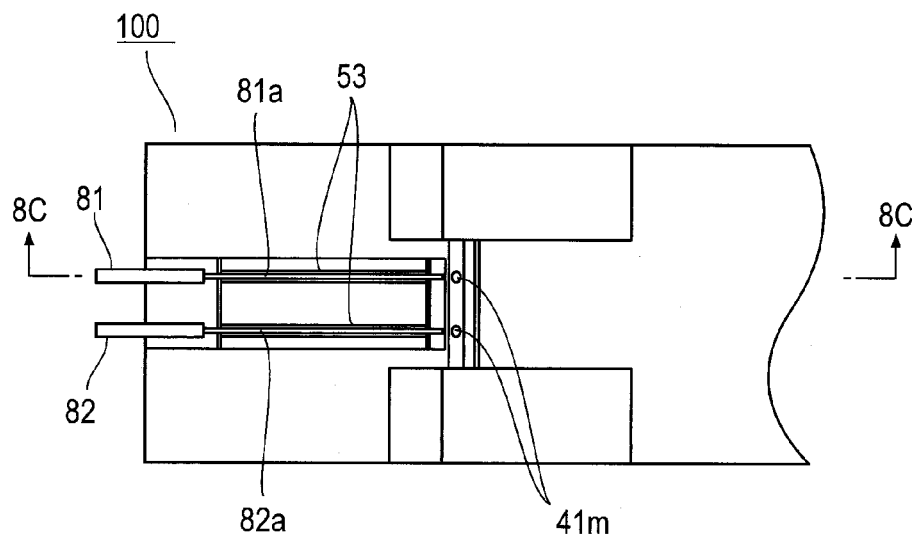
FIG. 8A is a bottom view of the optical module illustrated in FIG. 6A.
Figure 8B:
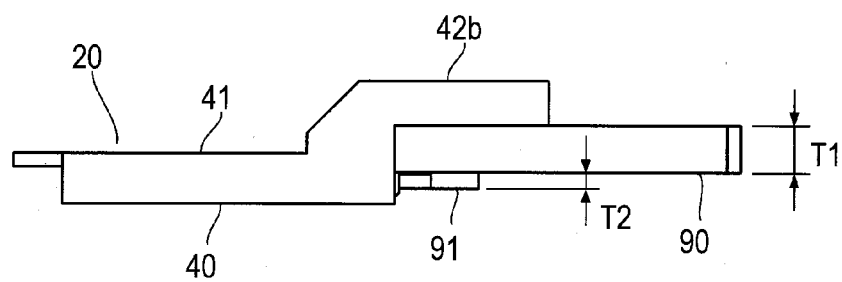
FIG. 8B is a front view of the optical module illustrated in FIG. 8A.
Figure 8C:
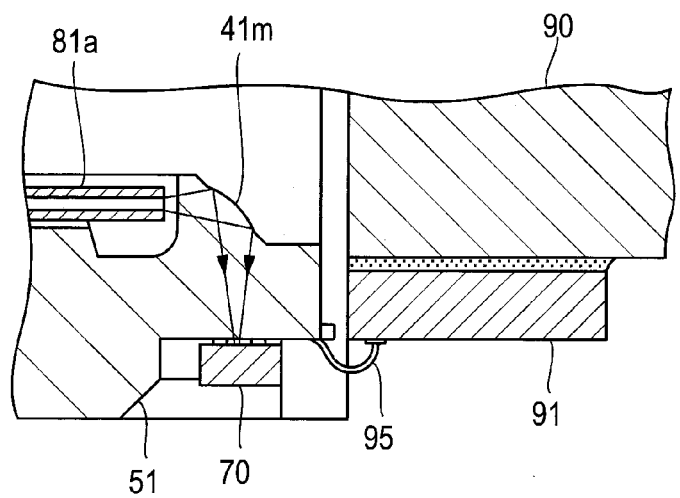
FIG. 8C is a partial enlarged view of section 8C-8C of FIG. 8A.

The difference (step height) between the height of the position of the lead parts 31*b* to 35*b* of the lead frames 31 to 35 of the optical module base 20 and the height of the substrate mounting part 42*b* is equal to $T_1+T_2$, as illustrated in FIG. 8B, where $T_1$ is the thickness of the substrate 90 and the $T_2$ is the thickness of the IC 91 connected to the lead parts. Setting the step height in this way makes the wire bonding surface of the IC flush with the wire bonding surface of the lead parts. Accordingly, the bonding wires 95 are short.

A configuration of one exemplary embodiment of an optical module base according to the present invention and an optical module configured with the optical module base have been described. The configuration of the optical module base 20 illustrated in FIGS. 2A to 2C has the following effects.

(1) Since a portion of the thickness of the connection parts 31*a* to 35*a* of the lead frames 31 to 35 to be connected to the electrodes of an optical device is embedded in the resin structure 40, a sufficient strength of fixing to the resin structure 40 can be ensured. Accordingly, when ultrasonic vibration is used in flip-chip bonding, vibration of the connection parts 31*a* to 35*a* themselves can be minimized and the ultrasonic vibration can be concentrated on the bond part. Consequently, good bonding can be performed to provide a sufficient bounding strength. Thus, bonding can be accomplished with application of low-power ultrasonic vibration.

(2) Since the base end side of each of the connection parts 31*a* to 35*a* of the lead frames 31 to 35 that is connected to the lead parts 31*b* to 35*b* is bent to a position higher than the lead parts 31*b* to 35*b* to limit the surface joined with an electrode of the optical device to a small area, ultrasonic vibration can be further concentrated on the join part when a bonding method using ultrasonic vibration is used.

(3) Three connection parts of the lead frames are positioned in each of the optical device mounting parts 51, 52, the three connection parts are the vertices of a triangle, instead of being arranged in a straight line, and the optical device to be mounted is three-point-supported by the three connection parts. Accordingly, the optical device is stably mounted, good electrical connection (bonding) can be achieved, and positioning (optical axis alignment) is facilitated.

(4) Since the wire bonding surface of ICs mounted on the substrate 90 to be mounted to the substrate mounting part 42*b* is flush with the wire bonding surfaces of the lead parts of the lead frames because of the difference in height between the substrate mounting part 42*b* and the lead parts 31*b* to 35*b* of the lead frames 31 to 35, the bonding wires can be shortened, which is advantageous for fast transmission. Thus, the transmission speed can be increased.

A configuration illustrated in FIG. 9 will be described next.

Figure 9:
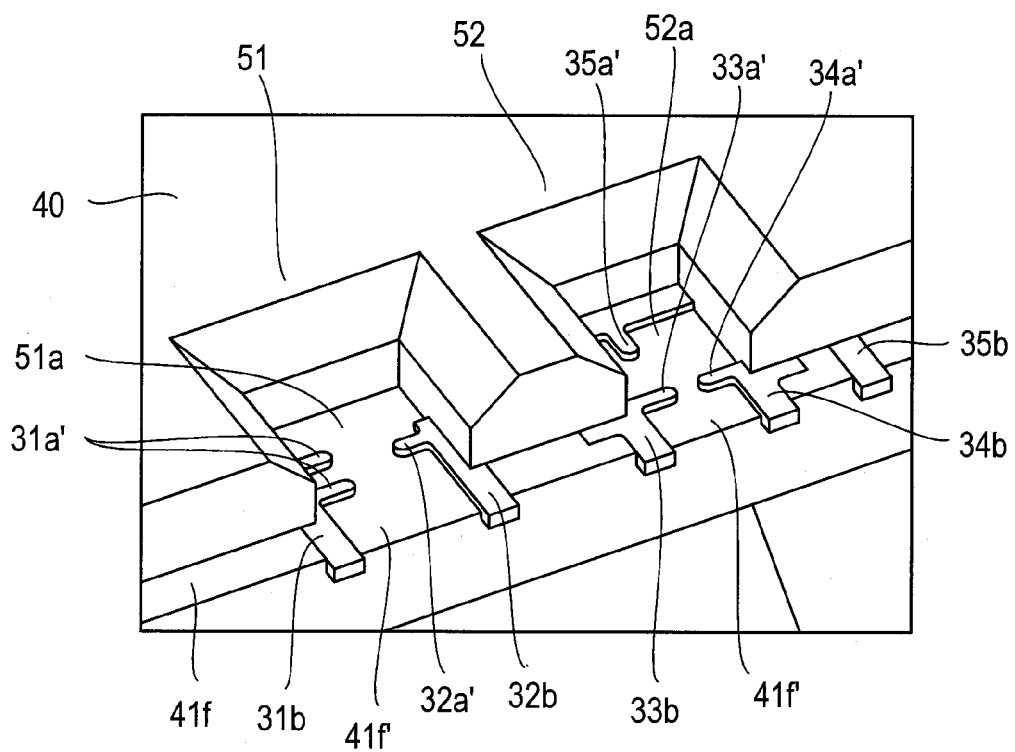
FIG. 9 is a partial enlarged view illustrating another exemplary embodiment of an optical module base according to the present invention.

FIG. 9 illustrates a configuration of a subject part of another exemplary embodiment of an optical module base according to the present invention. In this example, connection parts 31*a*' to 35*a*' of lead frames 31 to 35 are not bent but are flush with lead parts 31*b* to 35*b*.

On the other hand, the inner bottom surfaces 51*a*, 52*a* of optical device mounting parts 51, 52 provided in the resin structure 40 are lower than the upper surface of lead frames 31 to 35 and a part 41*f*' of the step surface 41*f* that is continuous with the inner bottom surfaces 51*a*, 52*a* is also lower than the upper surface of the lead frames 31 to 35 and are flush with the inner bottom surfaces 51*a*, 52*a*.

Since a portion of the thickness of each of the connection parts 31*a*' to 35*a*' of the lead frames 31 to 35 is embedded in the resin structure 40 in this exemplary embodiment as well, a sufficient strength of fixing to the resin structure 40 can be ensured.

While exemplary embodiments of the present invention have been described, it should be noted that the optical module base may be configured to have only one optical device mounting part instead of two, or to mount one of a surface emitting device and a surface light-receiving device.

The optical waveguide mounting parts that position optical fibers may be holding holes for holding and fixing optical fibers, instead of the V-shaped groove. The optical waveguides are not limited to optical fibers; the optical waveguides may be an optical waveguide circuit substrate.

While the lead frames are plated with gold, gold bumps may be provided at the connection parts of the lead frames that are to be connected to electrodes of an optical device.

What is claimed is:

1. An optical module base made up of a plurality of lead frames and a resin structure integrally molded with the lead frames and having an optical device mounting part and an optical waveguide mounting part which are formed in the resin structure,
wherein:
   each of the lead frames comprises a connection part to which an optical device is to be mounted and electrically connected and a lead part continuous with the connection part; and
   the connection part is positioned at the optical device mounting part such that a portion of the thickness of the connection part is embedded in the resin structure and another portion of the thickness of the connection part protrudes from a surface of the resin structure.

2. The optical module base according to claim 1,
wherein a base end of the connection part that is connected to the lead part is bent and the connection part is positioned higher than the lead part.

3. The optical module base according to claim 2,
wherein the difference in height between the connection part and the lead part is smaller than the thickness of the lead frame.

4. The optical module base according to claim 1,
wherein three of the connection parts are positioned at the optical device mounting part so that the optical device is three-point-supported by the three connection parts.

5. The optical module base according to claim 2,
wherein three of the connection parts are positioned at the optical device mounting part so that the optical device is three-point-supported by the three connection parts.

6. The optical module base according to claim 3,
wherein three of the connection parts are positioned at the optical device mounting part so that the optical device is three-point-supported by the three connection parts.

7. The optical module base according to claim 1,
wherein the optical device mounting part is a recess formed at an edge of one surface of the resin structure; and
the recess is opened at a side surface of the resin structure, the side surface being continuous with the one surface.

8. The optical module base according to claim 7,
wherein the lead part is run to the side surface.

9. The optical module base according to claim 7,
wherein the resin structure is transparent to light handled by the optical device; and
the optical waveguide mounting part is formed on an opposite surface of the resin structure that is opposite from the one surface.

10. The optical module base according to claim 9,
wherein the optical device is one or both of a surface emitting device and a surface light-receiving device; and
a reflective surface is formed in the opposite surface of the resin structure, the reflective surface converting an optical path between an optical waveguide mounted to the optical waveguide mounting part and the optical device to align optical axes.

11. The optical module base according to claim 10,
wherein the optical waveguide to be mounted to the optical waveguide mounting part is an optical fiber; and
the optical waveguide mounting part is a groove or a holding hole which positions the optical fiber.

12. The optical module base according to claim 7,
wherein the resin structure includes a substrate mounting part protruding and extending from the side surface.

13. The optical module base according to claim 8,
wherein the resin structure includes a substrate mounting part protruding and extending from the side surface.

14. The optical module base according to claim 9,
wherein the resin structure includes a substrate mounting part protruding and extending from the side surface.

15. The optical module base according to claim 10,
wherein the resin structure includes a substrate mounting part protruding and extending from the side surface.

16. The optical module base according to claim 11,
wherein the resin structure includes a substrate mounting part protruding and extending from the side surface.

17. An optical module comprising:
an optical module base of claim 12;
an optical device mounted to the optical device mounting part;
an optical waveguide mounted to the optical waveguide mounting part; and
a substrate on which an IC to be connected to the lead part by wire bonding is mounted;
wherein the substrate is mounted to the substrate mounting part; and
a wire bonding surface of the IC is flush with a wire bonding surface of the lead part.

18. An optical module comprising:
an optical module base of claim 13;
an optical device mounted to the optical device mounting part;
an optical waveguide mounted to the optical waveguide mounting part; and
a substrate on which an IC to be connected to the lead part by wire bonding is mounted;
wherein the substrate is mounted to the substrate mounting part; and
a wire bonding surface of the IC is flush with a wire bonding surface of the lead part.

19. An optical module comprising:
an optical module base of claim 14;
an optical device mounted to the optical device mounting part;
an optical waveguide mounted to the optical waveguide mounting part; and
a substrate on which an IC to be connected to the lead part by wire bonding is mounted;
wherein the substrate is mounted to the substrate mounting part; and
a wire bonding surface of the IC is flush with a wire bonding surface of the lead part.

20. An optical module comprising:
an optical module base of claim 15;
an optical device mounted to the optical device mounting part;
an optical waveguide mounted to the optical waveguide mounting part; and
a substrate on which an IC to be connected to the lead part by wire bonding is mounted;
wherein the substrate is mounted to the substrate mounting part; and
a wire bonding surface of the IC is flush with a wire bonding surface of the lead part.

21. An optical module comprising:
an optical module base of claim 16;
an optical device mounted to the optical device mounting part;
an optical waveguide mounted to the optical waveguide mounting part; and
a substrate on which an IC to be connected to the lead part by wire bonding is mounted;
wherein the substrate is mounted to the substrate mounting part; and
a wire bonding surface of the IC is flush with a wire bonding surface of the lead part.

* * * * *